July 25, 1933.　　　　　L. E. MARTIN　　　　　1,919,898
PORTABLE KITCHEN
Filed May 27, 1931　　　2 Sheets-Sheet 1
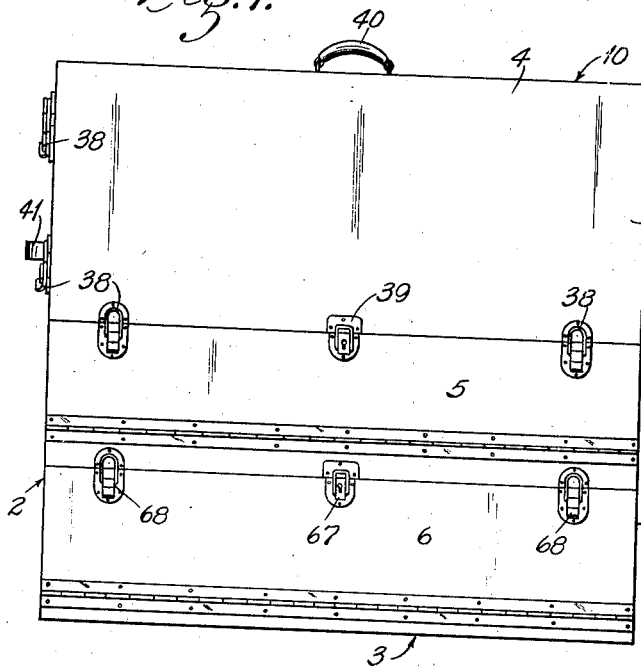
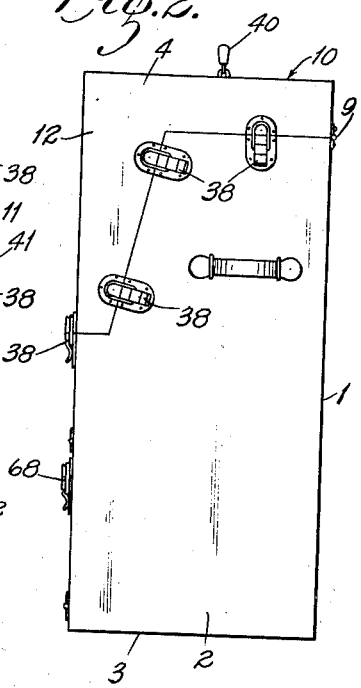
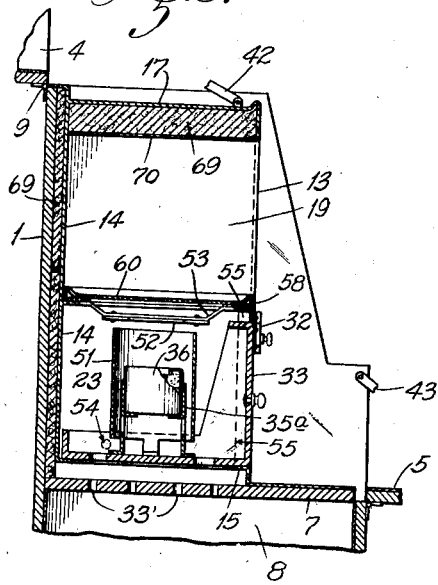
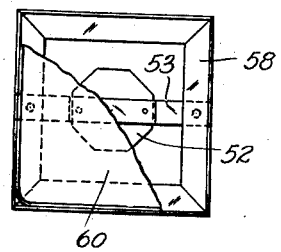
INVENTOR:
L. E. MARTIN.
By Albert J. McCauley
ATTORNEY.

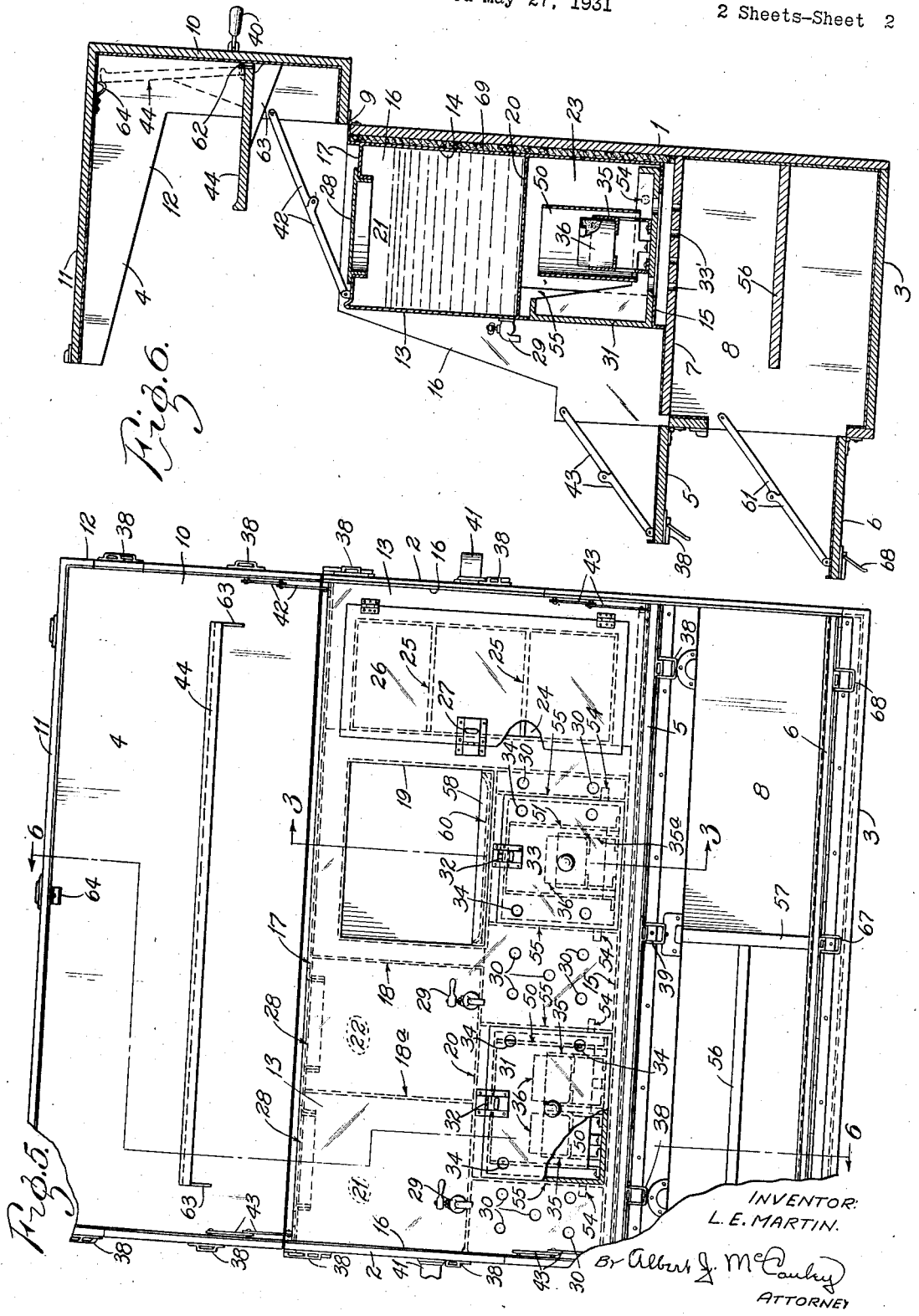

Patented July 25, 1933

1,919,898

UNITED STATES PATENT OFFICE

LEWIS E. MARTIN, OF ST. LOUIS, MISSOURI

PORTABLE KITCHEN

Application filed May 27, 1931. Serial No. 540,409.

This invention relates to a portable kitchen, one of the objects being to produce a small, compact and complete kitchen adapted to be lifted and carried by hand.

Prior to this invention dining cars on railroads have been equipped with large kitchens and dining rooms involving high manufacturing costs and high charges for transportation of the cars, in addition to special service costs. Therefore, many trains are not provided with dining cars, and one of my objects is to produce a simple, inexpensive and practicable means for preparing hot meals in an ordinary railroad coach.

Heretofore, cold food has been served in such coaches, and relatively large kitchens for buffet service have been built into car structures, but this involves considerable expense and the use of space in the car. One of my objects is to produce a kitchen so small that it can be carried by hand and used on the seat of an ordinary coach, and actual use of the invention has shown that it is a complete and entirely satisfactory solution of the problem of installing a very inexpensive kitchen in a railway coach.

The new device preferably includes a case containing the kitchen and forming the outer walls thereof, and a hand-receiving device whereby the entire kitchen can be lifted and carried. The case can be mounted on one or two seats of a coach and then opened to expose the kitchen which is ready for immediate use. The same kitchen may be advantageously used in buses, airplanes, and other places.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. 1 is a front view of a kitchen embodying the features of this invention.

Fig. 2 is a side view.

Fig. 3 is a fragmentary section taken on the line 3—3 in Fig. 5, and shows a grill and the structure for heating the grill.

Fig. 4 is a top view of the grill, a portion of the grill being broken away to show the flame spreader which is located below the grill.

Fig. 5 is a fragmentary view showing the case in its unfolded or open condition to expose the interior of the kitchen.

Fig. 6 is a section taken on the line 6—6 in Fig. 5.

To illustrate one form of the invention, I have shown a case comprising a rear wall 1, side wall members 2, a bottom 3, a top closure 4 and front closures 5 and 6. The kitchen proper includes a floor 7 which forms the ceiling of a storage basement 8. The lower closure 6 is hinged to the lower portion of the basement and forms the front wall of said basement. When this closure 6 is open, it forms a shelf as shown in Fig. 6.

The front closure 5 is hinged to the kitchen floor and when open, it forms a horizontal continuation of this floor.

The top closure 4 is hinged at 9 to the rear upper corner of the body of the case. When the case is closed (Figs. 1 and 2) the wall member 10 of the top closure extends horizontally at the top, and the wall member 11 extends downwardly at the front of the case, so as to meet the lower closure 5. However, when the top closure 4 is open, (Figs. 5 and 6), its wall member 10 lies in a vertical position at the rear of the kitchen, while the wall member 11 forms the ceiling of the open kitchen.

When the device is in service, the kitchen structure is thus extended vertically from the top of the body of the case. The kitchen is then open at the front, and spaces for ventilation at the sides are formed between the side wall members 2 and the side flanges 12 on the top closure member.

The interior of the kitchen herein shown includes vertical front and rear walls 13 and 14, a bottom 15, side walls 16, and a top wall 17, all of which are preferably made of sheet metal. This metallic structure is divided into compartments (Fig. 5) by means of vertical partitions 18, 18ª and 19 (Fig. 5) and a horizontal partition 20.

The vertical partition 19 extends from the bottom 15 to the top wall 17, while the horizontal partition 20 extends from said vertical partition 18 to the side wall 16 at the left in Fig. 5. The vertical partitions 18 and 18ª extend from the horizontal partition 20 to the top wall 17.

A frame 58 may be located between the partitions 18 and 19. This frame supports a metallic pan or grill 60.

These metallic walls and partitions produce liquid compartments 21 and 22 above the partition 20, a grill 60 between the liquid compartment 22 and the vertical partition 19, a heating compartment 23 below said partition 20 and grill 60 and a pantry 24 at one side of said compartments. The pantry is provided with shelves 25 and a front door 26 having a latch 27. Each of the compartments 21 and 22 is provided with a closure 28 at the top and a faucet 29 at the bottom. The heating compartment 23 has openings 30 (Fig. 5) in its front wall, and drawers 31 and 33 below said liquid compartments and grill.

These drawers 31 and 33 are provided with latches 32, and openings 34 are formed in the front of the drawers. These openings provide for the admission of air and the discharge of products of combustion.

To illustrate a convenient heating appliance which has been found satisfactory in actual service, I have annular collars 35 extending upwardly from the bottom of the drawer 31 and an annular collar 35ª extending upwardly from the bottom of the drawer 33. Each of the collars forms a seat for a can of fuel 36. The floor of the combustion chamber 23 under the drawers may be provided with air inlets 33' to support combustion in the chamber.

These drawers can be readily opened to ignite or extinguish the fuel, and also to permit the insertion and removal of the canned fuel.

As shown in Figs. 5 and 6 a shield 50 surrounds the cans of fuel in the drawer 31 and extends upwardly to a point near the bottom of the liquid compartments so that the heat will be directed onto the bottom of the liquid compartments. This shield will, therefore, direct the heat to the desired higher location and thus prevent the heat from directly passing out through the openings 30 and 34. As shown in Fig. 5, the shield 50 is located under both of the liquid compartments so that only one of the cans of fuel may be used to keep both of the liquid containers hot after they have been sufficiently heated by the action of both cans of fuel.

The drawer 33 is likewise provided with a shield 51 which surrounds a can of fuel and extends upwardly from a point near the bottom of the grill 60 so that the heat will be directed to the bottom of the grill. Since the heat and flames are confined in the shield 51, they would intensely heat the portion of the grill directly above the shield. To prevent undue heating at this portion in the grill, I prefer to use a flame spreader 52 (Figs. 3 and 4) which is located between the shield and the bottom of the grill to distribute the heat over the bottom of the grill. The flame spreader 52 may be supported by a bar 53 which is secured to the supporting frame 58 for the grill.

Since this kitchen is especially adapted for use on trains, buses, etc., the stopping, starting and other motions of the train may occur while one of the drawers is being opened and the can of fuel lit. As a result the drawer may be pulled free from the kitchen and the can of fuel thrown onto the interior of the car.

To prevent such an accident, the drawers 31 and 33 are provided with stops 54 (Figs. 3, 5 and 6) which are adapted to strike against a flange 55 on the inner face of the front wall of the combustion chamber, to limit the opening of the drawers. It will, therefore, be impossible to remove the drawers from the kitchen so that they might be upset or thrown to discharge a lit can of fuel on to the interior of the car.

The compartment 21, at the left in Fig. 5, which is heated by the flame in the combustion chamber 23 below its bottom 20, may be used to cook or heat various articles of food, such as eggs, sausage, soup, beans, etc., and the food may be in cans, or introduced directly into water contained in said compartment.

The adjoining compartment 22 may be used in the same way, but in actual practice I have used this compartment 22 to heat water for use in making coffee, tea and the like.

The grill 60 may be used to fry, warm, toast, etc., various articles of food.

The basement 8 below the kitchen floor may be used for the storage of food and other articles, and the same is true of the pantry 26. However, the pantry may also be used as a warming closet. The basement 8 may be provided with a shelf 56 and a partition 57 as shown in Fig. 5.

When the structure is closed, it can be locked by means of the latch devices 38 and 39 which secure the top closure to the body of the case and latch devices 67 and 68 which secure the basement closure 6 to the body of the case. A handle 40 on the top closure may then be used to lift and carry the entire apparatus. The body of the case and its contents will then be suspended from the hinge 9 and the latch devices 38 and 39.

Handles 41 on the side walls 2 may also be used in carrying the case, or in moving the structure when the case is open.

When the kitchen is in service, the top closure 4 is held in the extended position, shown in Fig. 6, by means of self-locking toggle links 42. The wall 11, which then forms the kitchen ceiling, is widely separated from the tops of the cooking compartments, so there is ample space for the removal of the closures 28 and the introduction of food or water into these cooking compartments.

At this time, the closure 5 is held by toggle links 43 in a horizontal position to form a ledge or shelf which extends from the kitchen floor, and the lower closure 6 may likewise be held by toggle links 61 in a horizontal position to form a shelf.

Another horizontal shelf 44 extends from the wall 10 when the closure is open. This shelf is secured to the wall 10 by the hinges 62 and may be held in a horizontal position by the flanges 63 which extend from the bottom the shelf and are adapted to be seated on the wall 10. When the closure 4 is moved to a closed position shown in Fig. 1, the shelf 44 occupies the position shown by dotted lines in Fig. 6. A spring clip 64 will then hold the shelf 44 in position shown by dotted lines in Fig. 6.

Insulating material 69 may be located between the rear wall 1 and the metallic wall 14, and also between the top wall 17 and lower wall 70 over the grill 60.

The kitchen herein disclosed is a convenient form of the apparatus which I have used to furnish hot meals in railway coaches, but the invention is not limited to this specific combination of details, as it has a much broader aspect.

This invention enables one to very readily furnish hot meals at a low cost, without difficult or expensive service, under conditions and at places where such meals were not obtainable prior to the present invention. The following claims are, therefore, intended to include all modifications within the scope of the invention.

I claim:

1. A portable kitchen comprising a case containing a heating compartment provided with a heating element, a cooking compartment in the form of a liquid-container having a bottom at the top of said heating compartment, said cooking compartment being provided with a closure at the top and a faucet at the bottom, said case having a wall below all of said parts forming the floor of the kitchen, said wall being provided with openings below said heating element for the admission of air to said heating element, a rear wall at the rear of all of said parts, side wall members at opposite sides of said parts, closure members at the top and front of the case adapted to be opened to expose the interior of the kitchen, a basement below said floor, a closure at the front of said basement, and a hand-receiving device whereby the entire kitchen and basement are carried.

2. A portable kitchen comprising a case containing a heating compartment provided with heating elements, liquid compartments and a grill having bottom walls forming the top of said heating compartment, each of said liquid compartments being provided with a closure at the top and a faucet at the bottom, a pantry at one side of said compartments, said case having a body provided with a top closure extending horizontally over the top and downwardly in front of said compartments, and a lower front closure hinged to the said case and meeting the top closure when the case is closed, said kitchen being open at the front and top to expose said compartments when the case is open, and a hand-receiving device whereby said case is carried.

3. A portable kitchen comprising a case containing a heating compartment provided with heating elements, liquid compartments having bottom walls forming the top of said heating compartment, a pantry at one side of said compartments, said case having a body provided with a top closure hinged to the upper rear corner of said body and extending horizontally over the top and downwardly in front of said compartments, said top closure being provided with a shelf extending from the inner face of its top wall and located in a horizontal position when the closure is open, and a lower front closure hinged to the said body and meeting the top closure when the case is closed, said case being open at the front and top to expose said compartments when the case is open.

4. A portable kitchen comprising a case containing a heating compartment including drawers provided with stops to limit the opening of the drawers, removable heating elements in said drawers, a cooking compartment and a hot water compartment having bottom walls forming the top of said heating compartment, said drawers being provided with shields open at the top to direct the heat from said heating elements to said bottom walls, a pantry at one side of said compartments, said case having a body provided with a top closure hinged to the upper rear corner of the case and extending horizontally over the top and downwardly in front of said compartments, said top closure being provided with a shelf extending from the inner face of its top wall and located in a horizontal position when the closure is open, and a lower front closure located in front of said drawers, said lower front closure being hinged to the said case and meeting the top closure when the case is closed, said case being open at the front and top to expose said compartments when the case is open.

5. A portable kitchen comprising a case containing a cooking compartment and a heating device below said compartment, said case having walls at opposite sides of said compartment, a wall at the rear, and a closure hinged to the rear wall, said closure being provided with a top wall member forming the top of the case when the closure is closed and a front wall member at the front of the case extending downwardly in front of said compartment, and said closure being movable to an elevated open position wherein said front wall member forms the ceiling of the kitchen while said top wall member lies at the rear of the kitchen.

6. A portable kitchen comprising a case containing liquid compartments and a grill, a combustion chamber below said liquid compartments and grill, drawers in said combustion chamber, one of said drawers having two cans of fuel located therein, each of said cans of fuel being located under a liquid compartment, a shield surrounding each of said cans of fuel and extending upwardly to a point near the bottoms of said liquid compartments to direct the heat onto said liquid compartments, the other of said drawers being located below said grill, a can of fuel located in said drawer, and another shield surrounding said last mentioned can of fuel and extending upwardly to a point near the bottom of said grill to direct the heat onto the bottom of said grill, both of said drawers being provided with stops adapted to strike against a wall of said combustion chamber to limit the opening of said drawers.

LEWIS E. MARTIN.